May 6, 1958  H. E. MUCKLEY ET AL  2,833,305
GRID-TYPE VALVES

Filed Jan. 20, 1956  2 Sheets-Sheet 1

Inventors
H. E. Muckley
J. Waldron
By Attys.

United States Patent Office 2,833,305
Patented May 6, 1958

2,833,305
GRID-TYPE VALVES

Henry Edward Muckley, Barnt Green, and John Waldron, Edgbaston, Birmingham, England, assignors to Belliss & Morcom Limited, Birmingham, England Application January 20, 1956, Serial No. 560,438

Claims priority, application Great Britain April 19, 1955

2 Claims. (Cl. 137—516.13)

This invention relates to valves for use in, for example, air compressors, and of the type comprising a grid-like seating having therein a concentric arrangement of ports, a ported closure member movable off and on to the seating, a resilient and spring loaded cushion plate, and a guard plate, the closure member and cushion plate being situated between the seating and guard plate.

One of the disadvantages of a valve of the said type of conventional construction is that during normal movements of the closure member from and to its seating, friction occurs between the closure member and a guide provided therefor, with consequent risk of stalling of the closure member, or of wear which results in displacement of the closure member relatively to its seating and consequent leakage of fluid when the said member is in its closed position.

The object of the present invention is to provide an improved valve which enables the above mentioned disadvantage to be obviated in a simple and reliable manner.

The invention comprises a valve of the type specified, having in combination a grid-like ported seating, a guard plate spaced from the seating, a ported closure member situated between the seating and guard plate and movable off and on to the seating, a resilient cushion plate situated between the closure member and guard plate, means securing the guard plate and cushion plate to the seating, a ring secured to deflectable parts of the cushion plate and closely fitting a central aperture in the closure member to prevent lateral movement of the latter in its own plane relatively to the seating, and helical springs arranged between the guard plate and cushion plate and acting on the closure member through the deflectable parts of the cushion plate, the latter being slotted and slit to provide the said deflectable parts which are deflected by the springs out of the plane of the cushion plate into contact with the closure member, and are movable with the closure member.

Figure 1:
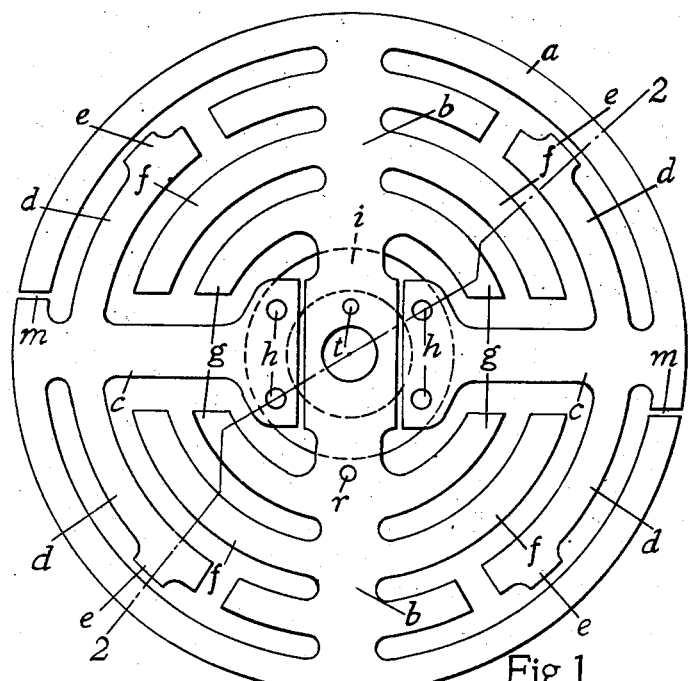
Figure 1 is a plan and Figure 2 a cross-section on the line 2—2 of the Figure 1 illustrating one form of cushion plate of a valve embodying the invention.
Figure 2:

Referring to Figures 1 and 2, the cushion plate there shown is made from a thin disc of steel or other resilient metal. Alternatively it may be made from a resilient non-metallic plastic. The disc is slotted to form a narrow peripheral rim $a$, a diametrical bar $b$, a pair of arms $c$ extending radially inwards from the rim and at right angles to the bar, and a pair of segmental branches $d$ extending laterally from each of the arms and situated adjacent to the rim. Alternatively, and particularly in discs of large diameter, arm $c$ may be of bifurcated V-shape having its apex adjacent to the centre of the disc. The surface areas of the free ends of the branches $d$ may be enlarged as shown to provide adequate abutments $e$ for the springs to be hereinafter mentioned. The plate may also be provided with other segmental branches $f$, $g$.

Figure 3:
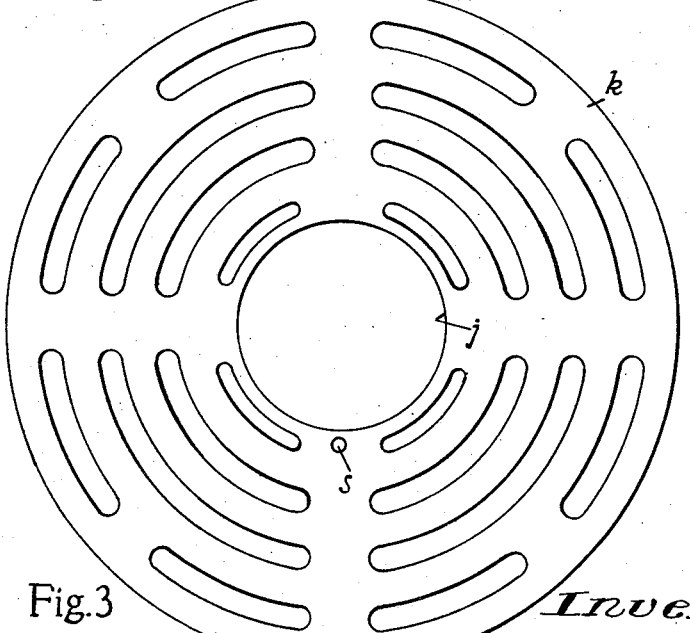
Figure 3 is a plan of the closure member with which the cushion plate shown in Figures 1 and 2 is adapted to co-operate.
Figure 4:
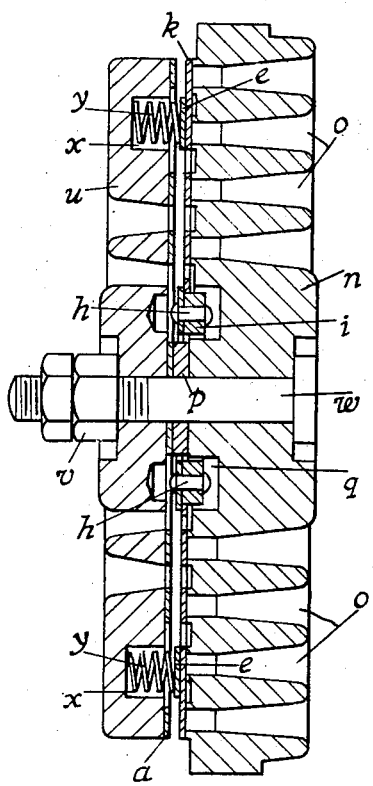
Figure 4 is a cross-sectional view of a valve in accordance with the invention provided with the cushion plate shown in Figures 1 and 2.

At the centre and at one side of the cushion plate, there is secured to the inner ends of the arms $c$ by rivets $h$ a ring $i$ which can occupy and closely fit a central aperture $j$ in the closure member $k$ (Figure 3) the ring serving to prevent lateral movement of the closure member in its own plane relatively to the valve seating shown in Figure 4. Further the rim $a$ of the cushion plate is slit at two positions $m$ adjacent to the arms $c$ to allow the arms and the branches $d$ to be deflected relatively to other parts of the plate.

A valve construction for which the cushion plate above described is employed is shown in Figure 4. It comprises a flat seating $n$ having therein a number of concentric rings of segmental ports $o$. At the centre of the seating is attached a washer $p$ of any convenient thickness for supporting the bar $b$ of the cushion plate, and around this washer there is formed in the seating an annular groove $q$ for accommodating the ring $i$ on the arms $c$. The closure member $k$ (as shown in Figure 3) consists of a thin metal or plastic disc having therein a plurality of rings of segmental ports situated opposite the lands between the ports $o$ in the seating, the closure member being held against lateral movement by the ring $i$ on the arms $c$ of the cushion plate, and being also held against rotational movement by, for example, a peg (not shown) extending from a guard plate $u$ through holes $r$, $s$ in the cushion plate and closure member. The cushion plate is held against lateral and rotational movement by a peg (not shown) extending from the seating through a hole $t$. The guard plate $u$ is held in position by a nut or nuts $v$ on a screw threaded stem $w$ extending from the seating through a hole in the bar and guard plate. In the underside of the guard plate are formed four equispaced sockets $x$ for helical springs $y$ which bear on the ends $e$ of the branches $d$ on the arms of the cushion plate. By the action of the springs the branches $d$ and arms $c$ are deflected out of the plane of the other parts of the closure member and thereby caused to hold the closure member in contact with the seating.

When during the action of the valve, the closure member is intermittently moved off and on to its seating, no relative movement occurs between the ring $i$ and the closure member $k$. Consequently no friction occurs between the intercontacting parts of the closure member and cushion plate and no wear can occur at the periphery of the orifice $j$ in the closure member occupied by the ring. Risk of stalling of the closure member or of detrimental movement of the said member in its own plane relatively to the seating is thereby effectively obviated.

Having thus described our invention what we claim as new and desire to secure by Letters Patent is:

1. A valve of the type specified, comprising in combination a grid-like ported seating, a guard plate spaced from said seating, a ported closure member situated between said seating and guard plate and movable off and on to said seating, a resilient cushion plate situated between said closure member and guard plate, means securing said guard plate and cushion plate to said seating, a ring secured to deflectable parts of said cushion plate and closely fitting a central aperture in said closure member to prevent lateral movement of the latter in its own plane relatively to said seating, and helical springs arranged between said guard plate and cushion plate and acting on said closure member through other deflectable parts of said cushion plate, the latter being slotted and slit to provide said deflectable parts which are deflected by said springs out of the plane of said cushion plate into contact with said closure member, and are movable with said closure member.

2. A valve according to claim 1, in which the deflectable parts of the cushion plate comprise a pair of inwardly extending radial arms to the inner ends of which the ring is secured, and branches extending from said arms and forming abutments for the springs.

References Cited in the file of this patent

UNITED STATES PATENTS

| | | |
|---|---|---|
| 1,695,069 | Tuttle | Dec. 11, 1928 |

FOREIGN PATENTS

| | | |
|---|---|---|
| 487,926 | Great Britain | June 28, 1938 |
| 156,249 | Australia | Apr. 28, 1954 |